US010865691B2

(12) United States Patent
Park et al.

(10) Patent No.: US 10,865,691 B2
(45) Date of Patent: Dec. 15, 2020

(54) TURBOCHARGER FASTENING STRUCTURE

(71) Applicants: Hyundai Motor Company, Seoul (KR); Kia Motors Corporation, Seoul (KR)

(72) Inventors: Jung Joo Park, Gunpo-Si (KR); Han Sang Kim, Ansan-Si (KR); Min Sub Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/437,379

(22) Filed: Jun. 11, 2019

(65) Prior Publication Data

US 2020/0173333 A1 Jun. 4, 2020

(51) Int. Cl.
*F01N 13/10* (2010.01)
*F01D 25/28* (2006.01)
*F02B 37/02* (2006.01)
*F01N 13/18* (2010.01)

(52) U.S. Cl.
CPC .......... *F01N 13/10* (2013.01); *F01D 25/28* (2013.01); *F01N 13/1805* (2013.01); *F02B 37/02* (2013.01); *F01N 2260/10* (2013.01); *F05D 2220/40* (2013.01)

(58) Field of Classification Search
CPC .. F01N 13/10; F01N 13/1805; F01N 2340/04; F01N 2260/10; F02B 37/00; F02B 37/02; F02B 37/025; F05D 2220/40; F01D 25/28

USPC .......... 60/597, 598, 605.1, 280, 323
See application file for complete search history.

(56) References Cited

U.S. PATENT DOCUMENTS

| 2005/0028523 | A1* | 2/2005 | Nishiyama | F01D 9/026 60/605.1 |
| 2007/0216109 | A1* | 9/2007 | Friedow | F01N 13/1827 277/593 |
| 2009/0026009 | A1* | 1/2009 | Itoh | F02B 37/025 181/227 |
| 2017/0362986 | A1* | 12/2017 | Niwa | F01N 3/2839 |

FOREIGN PATENT DOCUMENTS

KR 10-1639345 B1 7/2016

* cited by examiner

*Primary Examiner* — Mark A Laurenzi
*Assistant Examiner* — Mickey H France
(74) *Attorney, Agent, or Firm* — Morgan, Lewis & Bockius LLP

(57) ABSTRACT

A turbocharger fastening structure may include an exhaust manifold integrated head having two exhaust ports; a fastening unit located on one end portion of a turbocharger to be fastened to the exhaust manifold integrated head; and an intake hole formed on the fastening unit, corresponding to the two exhaust ports of the exhaust manifold integrated head, and having a rib, the intake hole allowing exhaust gas to enter the turbocharger through the exhaust manifold integrated head.

7 Claims, 3 Drawing Sheets

TURBOCHARGER FASTENING STRUCTURE

CROSS REFERENCE TO RELATED APPLICATION

The present application claims priority to Korean Patent Application No. 10-2018-0152500, filed Nov. 30, 2018, the entire contents of which is incorporated herein for all purposes by this reference.

BACKGROUND OF THE INVENTION

Field of the Invention

The present invention relates generally to a turbocharger fastening structure and, more particularly, to a turbocharger fastening structure for a turbocharger fastened to an exhaust manifold integrated head and including a fastening unit conforming to the exhaust manifold integrated head having two holes, the turbocharger fastening structure improving flows of exhaust gas and preventing the exhaust manifold integrated head from being damaged by heat.

Description of Related Art

Generally, a turbocharger serves to rotate a turbine wheel using energy of exhaust gas and deliver compressed air to a cylinder by compressing intake air using a compressor. A body of the turbocharger has a simple structure connecting the turbine wheel and the compressor wheel to a single shaft and accommodating each of the turbine wheel and the compressor wheel in a housing. The body of the turbocharger is located adjacently to a branch collecting portion of the exhaust manifold.

Kinematic components or wastegate components of the turbocharger are required to have high physical properties, since high kinematic energy is applied thereto. Furthermore, the above-described components are required to have heat-resistant performance, since such components operate in a high-temperature environment.

In other words, the components of the turbocharger may maintain predetermined strength and resultant dimensional stability even in a high-temperature environment. Furthermore, the components of the turbocharger may have high abrasion resistance and high oxidation resistance, such that the corrosion and abrasion of the material may be reduced in a high operating temperature of several hundred Celsius degrees and the endurance of the material may be guaranteed even in extremely hostile operation conditions.

Furthermore, since exhaust gas produced due to the operation of the engine is introduced to the turbocharger to generate driving force of the turbocharger, the turbocharger fastening unit connected to an engine exhaust manifold may have high heat resistance.

Recently, in an exhaust manifold having two exhaust ports of an exhaust manifold integrated head, a head rib between the two exhaust ports suffers from heat damage.

FIG. 1 and FIG. 2 illustrate a problem of heat damage occurring in a configuration in which a turbo charger 20 having a single intake hole 50 is fastened to two exhaust ports of an exhaust manifold integrated head 200 in an exhaust manifold 200 having an exhaust manifold head rib 210.

Due to such heat damage, the hardness of the head rib 210 located between the exhaust ports of the exhaust manifold integrated head 220 is lowered. In severe cases, the head rib 210 may be melted, which is problematic.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fastening structure including a rib in a turbocharger intake hole to correspond to an exhaust manifold integrated head including two exhaust ports.

The present invention is intended to propose a turbocharger fastening structure including a stopper between an exhaust manifold integrated head and a turbocharger fastening unit, such that the strength of beads against deterioration may be guaranteed.

The object of the present invention is not limited to the aforementioned description, and other objects not explicitly included herein will be clearly understood by those skilled in the art to which the present invention pertains from the description provided hereinafter. The objects of the present invention may be realized by a plurality of device defined in the Claims and combinations of the means.

In various aspects of the present invention, the turbocharger fastening structure may include the following configurations:

According to an exemplary embodiment of the present invention, provided is a turbocharger fastening structure including: an exhaust manifold integrated head having two exhaust ports; a fastening unit located on one end portion of a turbocharger to be fastened to the exhaust manifold integrated head; and an intake hole formed on the fastening unit, corresponding to the two exhaust ports of the exhaust manifold integrated head, and having a rib, the intake hole allowing exhaust gas to enter the turbocharger through the exhaust manifold integrated head.

Furthermore, in the turbocharger fastening structure, the rib may extend in a longitudinal direction along an intake pipe, and include a curved portion having a streamline shape on one end portion within the intake pipe.

Furthermore, the turbocharger fastening structure may further include a plurality of gaskets mounted on the fastening unit to conform to a shape of the intake hole.

Furthermore, the turbocharger fastening structure may further include at least one stopper positioned between predetermined gaskets among the plurality of gaskets.

Furthermore, in the turbocharger fastening structure, the stopper may include hemming portions on both end portions corresponding to both end portions a gasket, among the plurality of gaskets, on which the stopper is located.

The present invention is configured to provide the following effects due to combinations and utilizes of the above-described embodiments and following configurations.

The present invention is configured to ensure that the strength of the head rib of the exhaust manifold integrated head may be maintained without being damaged by exhaust gas.

Furthermore, the present invention is configured to reduce a heat interference region applied to the turbocharger fastening unit.

Furthermore, the present invention is configured to improve flows of exhaust gas entering through an intake hole of the turbocharger.

The methods and apparatuses of the present invention have other features and advantages which will be apparent from or are set forth in more detail in the accompanying drawings, which are incorporated herein, and the following Detailed Description, which in combination serve to explain certain principles of the present invention.

Figure 1:
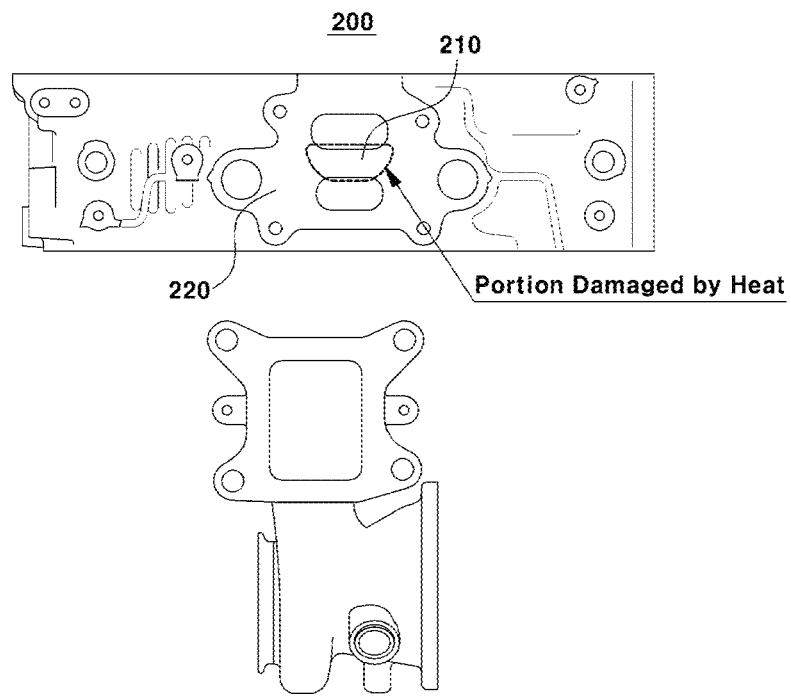
FIG. 1 illustrates a related-art coupling structure for a turbocharger including an exhaust manifold integrated head including two exhaust ports and a turbocharger including one inlet.
Figure 2:
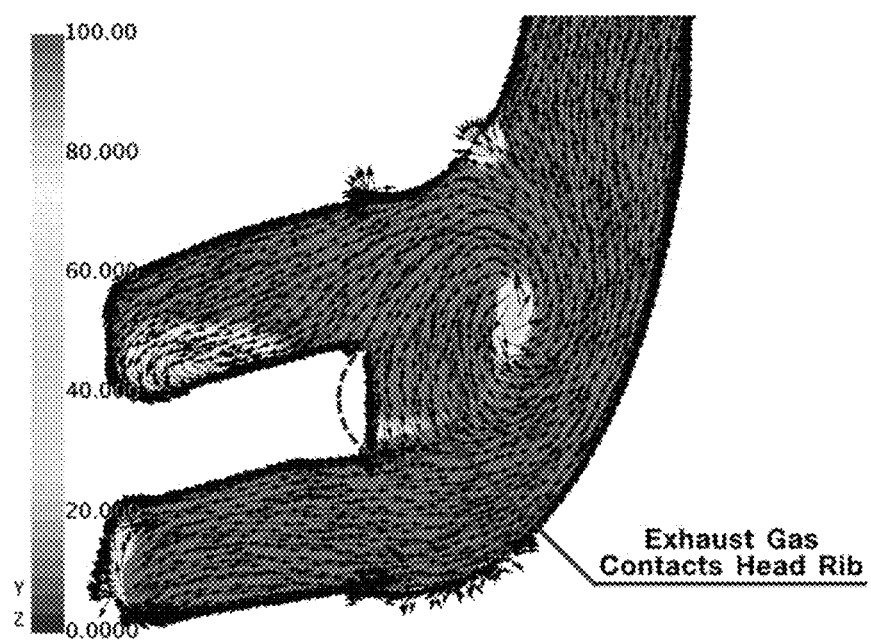
FIG. 2 illustrates a result of thermal analysis of a coupling structure for an exhaust manifold integrated head including two exhaust ports and a turbocharger including a single intake hole.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is intended to cover not only the exemplary embodiments of the present invention, but various alternatives, modifications, equivalents and other embodiments, which may be included within the spirit and scope of the present invention as defined by the appended claims.

Hereinafter, various exemplary embodiments of the present invention will be described in more detail. The present invention may, however, be embodied in various forms and is configured to not be construed to be limited to the exemplary embodiments set forth herein. Rather, these embodiments are provided so that the present disclosure will be thorough and complete, and will fully convey the scope of the present invention to those skilled in the art.

It will be understood that the terms, such as "unit" and " . . . rib", used herein may be realized by hardware.

It will be understood that, although the terms "first", "second", etc. are only used herein to distinguish one element from another element. The sequence of the terms is not necessarily limited in the following description.

The present invention relates to technology on a turbocharger fastening structure facing an exhaust manifold integrated head 220 in a configuration of an exhaust manifold 200 of an engine, including the exhaust manifold integrated head 220 and two exhaust ports.

The turbocharger 100 according to the present invention has a single scroll configuration including a turbocharger housing 160, a turbine wheel located within the housing 160, and a compressor wheel comprised of the turbine wheel and a single shaft. The turbocharger 100 is configured to rotate the turbine wheel using exhaust gas entering through the exhaust manifold 200 of the engine.

Figure 3:
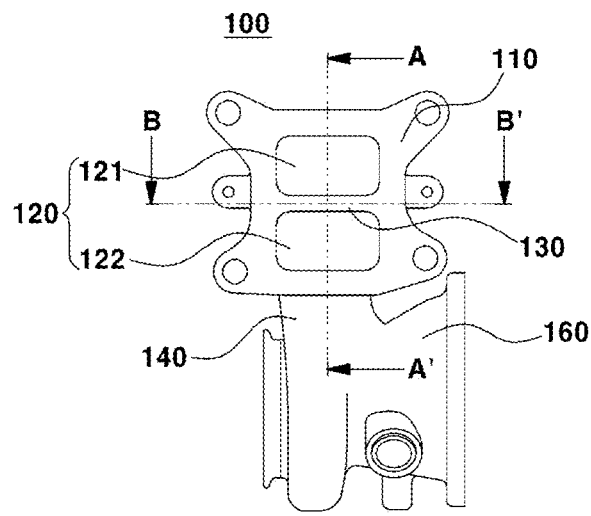
FIG. 3 illustrates a configuration of a turbocharger fastening unit of a turbocharger fastening structure according to an exemplary embodiment of the present invention.

As illustrated in FIG. 3, the exhaust manifold 200 according to an exemplary embodiment of the present invention includes the exhaust manifold integrated head 220. The exhaust manifold 200 may be configured such that exhaust gas entering through a runner connected to an engine cylinder is discharged through the single exhaust manifold integrated head 220. The runner according to an exemplary embodiment of the present invention may be mounted on each of engine cylinders.

Furthermore, the exhaust manifold integrated head 200 according to an exemplary embodiment of the present invention is configured to include two exhaust ports, such that exhaust gas entering through the runner is introduced to one end portion of the turbocharger 100 through the two exhaust ports.

A fastening unit 110 located on one end portion of the turbocharger housing 160 is fastened to the exhaust manifold integrated head 220. The fastening unit 110 has an intake hole 120 configured to overlap the entirety of the two exhaust ports.

The intake hole 120 is configured to conform to the two exhaust ports. A rib 130 may be provided in the center portion of the intake hole 120 such that the intake hole 120 is divided into two intake holes.

According to an exemplary embodiment of the present invention, the rib 130 may be located in the center portion of the intake hole 120. The configuration of the rib 130 may have the same orientation as the shape of a head rib 210 of the exhaust manifold integrated head 220. As described above, the rib 130 located in the center portion of the intake hole 120 may be altered depending on the shape of the exhaust manifold integrated head 220.

Figure 4:
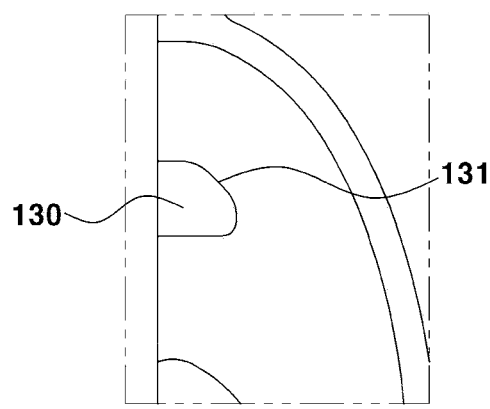
FIG. 4 is a cross-sectional view exemplarily illustrating the turbocharger fastening unit of the turbocharger fastening structure according to an exemplary embodiment of the present invention.

FIG. 4 is a cross-sectional view of portions including the turbocharger fastening unit 110 and the intake hole 120 according to an exemplary embodiment of the present invention, taken along A-A' line.

As illustrated in the drawings, the intake hole 120 allowing exhaust gas to enter there through is provided internal to the fastening unit 110 fastened to the exhaust manifold integrated head 220. The intake hole 120 is divided into top and bottom holes. According to an exemplary embodiment of the present invention, the intake hole 120 may include a first intake hole 121 located in the top portion of the fastening unit 110 and a second intake hole 122 located in the bottom portion of the fastening unit 110. The rib 130 is located in the center portion of the fastening unit 110 to divide the first intake hole 121 and the second intake hole 122.

Furthermore, the rib 130 extends in the longitudinal direction of an intake pipe 140 along the shape of the intake pipe 140. The intake pipe 140 is configured such that exhaust gas is introduced there through. Furthermore, one end portion of the rib 130 extending inward along the shape of the intake pipe 140 may have a streamlined shape including a curved portion 131.

The rib 130 according to an exemplary embodiment of the present invention extends into the intake pipe 140 by a predetermined length determined according to the length of the intake pipe 140. The shape or curvature of the curved portion 131, mounted on a distal end portion of the rib 130 extending into the intake pipe 140, may be set depending on the shape of the intake pipe 140.

As illustrated in the drawings, according to an exemplary embodiment of the present invention, the curved portion 131 of the rib 130 may be set such that the cross-sectional areas of the first intake hole 121 and the second intake hole 122 are constant. Since the intake pipe 140 of the turbocharger 100 is sharply bent, the width and length of the rib 130 are set to be constant. According to an exemplary embodiment of the present invention, the ratio of the horizontal width of the rib 130 with respect to the length of the rib 130 extending into the intake pipe may range 1:1 to 1:1.2.

As described above, the exhaust manifold integrated head 220 fastened to the turbocharger 100 including the rib 130 has a temperature lowering effect up to 35° C., compared to the configuration without the rib 130.

Figure 5:
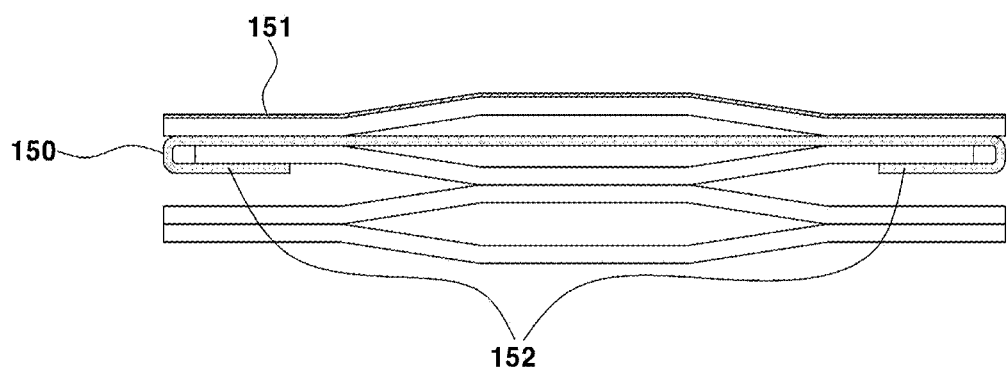
FIG. 5 is a cross-sectional view exemplarily illustrating a stopper of the turbocharger fastening unit of the turbocharger fastening structure according to an exemplary embodiment of the present invention.

FIG. 5 is a cross-sectional view exemplarily illustrating a configuration of a gasket 151 and a stopper 150 located around the first intake hole 121 and the second intake hole 122 in the fastening unit 110 according to an exemplary embodiment of the present invention.

The configuration of the rib 130 will be described with reference to a cross-section taken along line B-B' in FIG. 3. In the present configuration, a plurality of gaskets 151 are stacked on one another and disposed around the first intake hole 121 and the second intake hole 122. The stopper 150 is in contact with at least one gasket 151 among the plurality of gaskets 151.

The stopper 150 is located in one layer of a plurality of layers of gaskets 151. The stopper 150 is configured to support the gasket 151 so that the minimum height may be maintained even in the case in which beads of the gasket 151 have collapsed.

According to an exemplary embodiment of the present invention, the stopper 150 may be configured such that both end portions thereof are rolled to the bottom surface of the gasket 151 on which the stopper 150 is stacked. The stopper 150 is located on the top surface of at least one stopper 151 among the plurality of gaskets 151, and is provided with hemming portions 152 configured to surround both end portions of the gasket 151. The stopper 150 is configured to provide a minimum height in the case of the beads of the gasket 151 have collapsed, and both end portions of the stopper 150 may be selectively located inside or outside of the gasket 151.

In other words, the stopper 150 according to an exemplary embodiment of the present invention may be located between the gaskets 151, and may include the hemming portions 152 on both end portions.

According to an exemplary embodiment of the present invention, each of the gaskets 151 has a thickness of 0.25 mm, and the stopper 150 has a thickness of 0.15 mm. The stopper 150 is configured as above to prevent the height of beads from collapsing when the gasket 151 is exposed to a high-temperature environment.

In an exemplary embodiment of the present invention, the center portion of gaskets 151 is spaced with a gap from the stopper 150 in a predetermined distance and is collapsible.

Due to the above-described configuration of the stopper 150 having heat resistance, even in the case in which the beads of the gasket 151 have collapsed due to exposure to entering high-temperature exhaust gas, the heights of the intake hole 120 and the exhaust ports of the exhaust manifold integrated head 220 may be maintained.

That is, as illustrated in the drawings, the gaskets 151 are configured to maintain sealing. Even in the case in which the beads have been deformed or have collapsed due to the high-temperature environment, the configuration of the gasket 151 having at least a minimum height may be provided due to the stopper 150.

Figure 6:
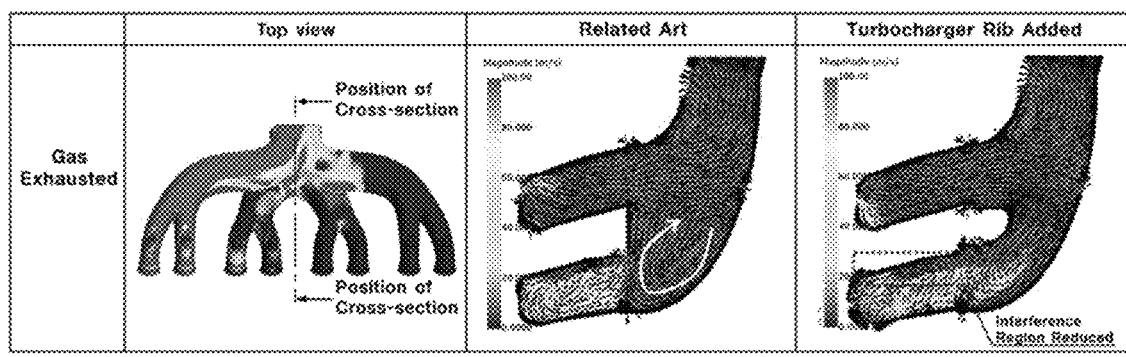
FIG. 6 illustrates results of thermal analysis of the turbocharger fastening structure according to an exemplary embodiment of the present invention when exhaust gas is flowing.

FIG. 6 illustrates results of thermal analysis in the presence of flows of exhaust gas from a vehicle including the fastening structure for the turbocharger 100 according to an exemplary embodiment of the present invention.

As illustrated in FIG. 6, in the case of the related art in which the intake hole 120 is not provided with the rib 130, exhaust gas flows along a head rib 210 located in the exhaust manifold integrated head 220. The exhaust gas entering through the intake hole 120 comprised of a single hole generates turbulence in a location of the intake pipe 140 having a significant curvature change. Furthermore, as a fore end portion of the region of turbulence, a flow interference region is formed within each of the gas exhaust ports, on the basis of the region of turbulence.

In contrast, in the case in which the fastening structure for the turbocharger 100 including the rib 130 located in the center portion of the intake hole 120, according to an exemplary embodiment of the present invention, is used, it may be appreciated that the flow interference region is reduced according to the thermal analysis regarding flows of exhaust gas.

That is, the result according to an exemplary embodiment of the present invention represents that the interference region within the exhaust manifold integrated head 220 is reduced, since exhaust gas is introduced more deeply into the intake pipe 140 along the rib 130 of the intake hole 120 of the turbocharger 100.

Figure 7:
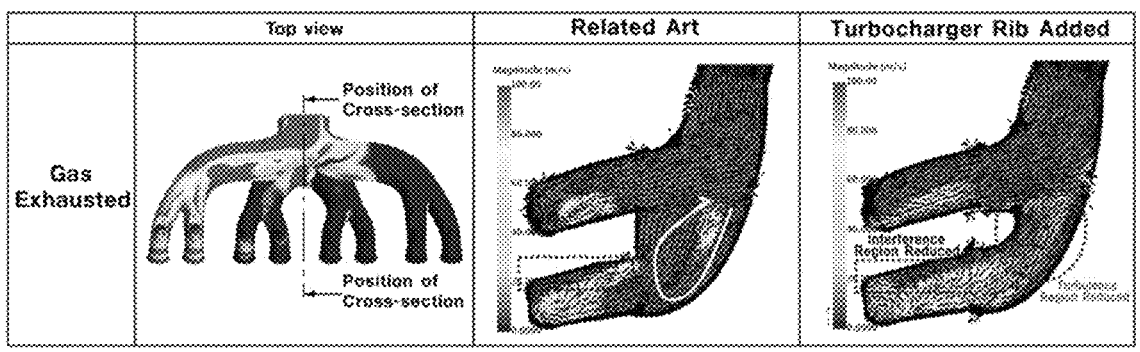
FIG. 7 illustrates results of thermal analysis of the turbocharger fastening structure according to an exemplary embodiment of the present invention after flowing of exhaust gas is finished.

Likewise, FIG. 7 illustrates results of thermal analysis in the absence of flows of exhaust gas from a vehicle including the fastening structure for the turbocharger 100 according to an exemplary embodiment of the present invention.

Similar to the results of FIG. 6, in the case of the related art in which the intake hole 120 is not provided with the rib 130, exhaust gas flows along a head rib 210 located in the exhaust manifold integrated head 220. The exhaust gas entering through the intake hole 120 comprised of a single hole generates turbulence in a location of the intake pipe 140 having a significant curvature change. Furthermore, as a fore end portion of the region of turbulence, a flow interference region is formed within each of the gas exhaust ports, on the basis of the region of turbulence.

In contrast, the result of thermal analysis using the fastening structure for the turbocharger 100 according to an exemplary embodiment of the present invention represents that the interference region within the exhaust manifold integrated head 220 is reduced and the region of turbulence is reduced, since exhaust gas is introduced more deeply into the intake pipe 140 along the rib 130 of the intake hole 120 of the turbocharger 100.

As set forth above, when the rib 130 is provided in the intake hole 120 of the turbocharger 100 to match the exhaust manifold integrated head 220, it is possible to prevent the exhaust manifold integrated head 220 from being damaged by heat while improving flows of exhaust gas entering the turbocharger 100.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A turbocharger fastening structure comprising:
   a fastening unit mounted on an end portion of a turbocharger and configured to be fastened to an exhaust manifold integrated head having two exhaust ports; and
   an intake hole having a rib and formed on the fastening unit, corresponding to the two exhaust ports of the exhaust manifold integrated head,
   wherein the intake hole is configured to allow exhaust gas to enter the turbocharger through the exhaust manifold integrated head,
   wherein the rib extends in a longitudinal direction thereof inside an intake pipe along the intake pipe, and
   wherein a ratio of a horizontal width of the rib to a length of the rib extending into the intake pipe ranges 1:1 to 1:1.2.

2. The turbocharger fastening structure of claim 1,
   wherein the rib includes a curved portion having a streamline shape on an end portion of the rib within the intake pipe.

3. The turbocharger fastening structure of claim 1,
   wherein the intake hole includes a first intake hole and a second intake hole divided by the rib.

4. The turbocharger fastening structure of claim 1, further including:
   a plurality of gaskets mounted on the fastening unit to conform to a shape of the intake hole.

5. The turbocharger fastening structure of claim 4, further including:
   at least one stopper positioned between predetermined gaskets among the plurality of gaskets.

6. The turbocharger fastening structure of claim 5, wherein a center portion of each gasket of the plurality of gaskets is spaced with a gap from a corresponding stopper among the at least one stopper and is collapsible.

7. The turbocharger fastening structure of claim 5,
   wherein the at least one stopper includes hemming portions on first and second end portions thereof corresponding to first and second end portions of at least a gasket on which the at least one stopper is located, among the plurality of gaskets.

* * * * *